Patented May 16, 1939

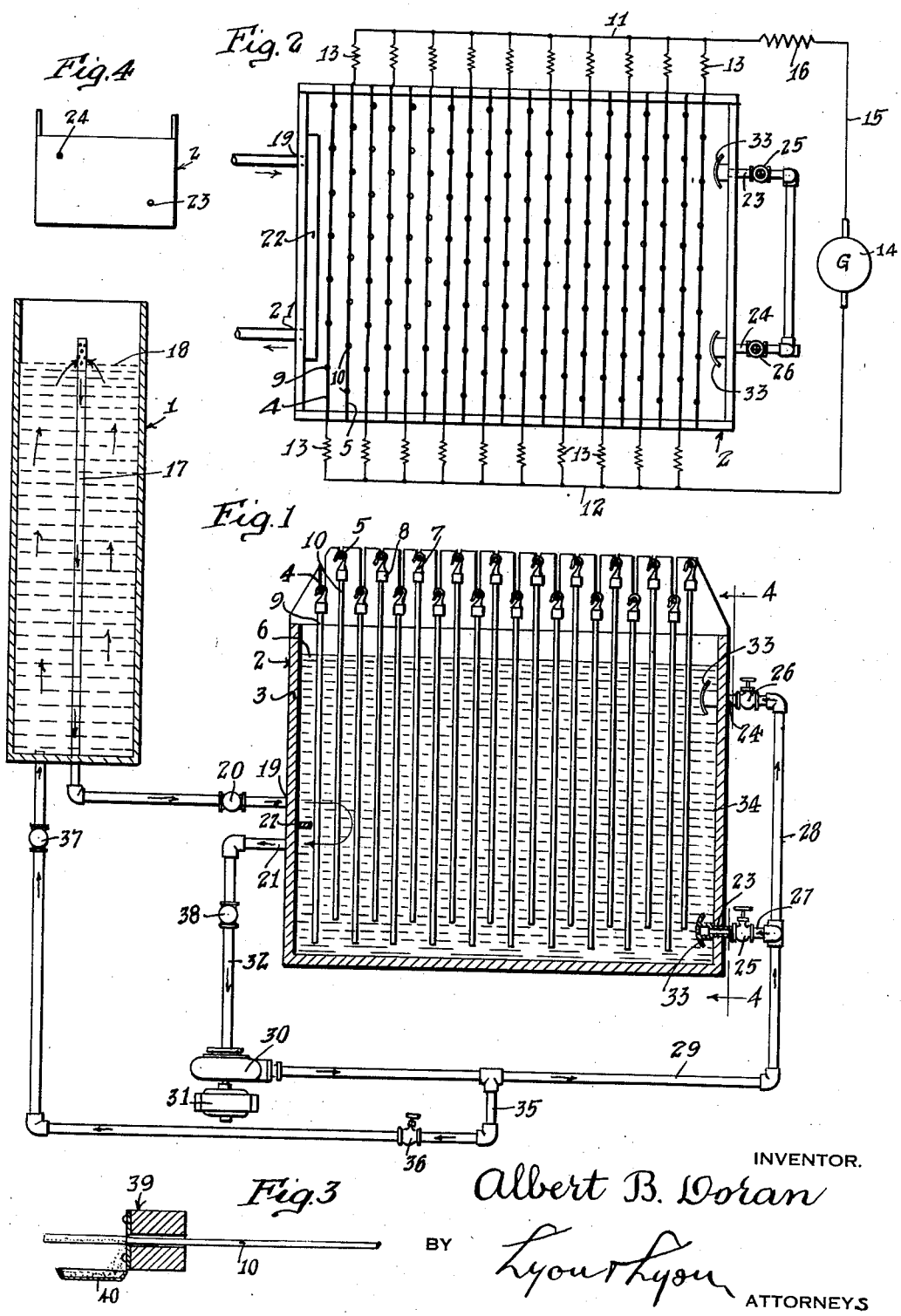

2,158,410

UNITED STATES PATENT OFFICE 2,158,410

METHOD AND APPARATUS FOR THE RECOVERY OF METAL FROM A LIQUID

Albert B. Doran, Los Angeles, Calif., assignor to International Cinema Inc., Los Angeles, Calif., a corporation of California Application June 15, 1935, Serial No. 26,793
Renewed October 8, 1938

6 Claims. (Cl. 204—5)

This invention relates to the recovery of an element such as a metal, from a bath, by electrolytic means, and while the invention may be applied for any special purpose, in the present specification it is described as applied to the recovery of silver from a fixing bath such as used for fixing photographic plates, or films.

In the clearing or fixing of photographic plates or films, sodium thio-sulphate, popularly known as "hypo" is employed to remove the undeveloped or unreduced silver halides from the emulsion on the plate or film. Although the silver is insoluble in water, it is freely soluble in hypo, and hence when a photographic film or plate is immersed in a hypo solution, certain soluble silver salts are formed and become dissolved in the hypo solution. It is desirable to recover the silver from the hypo solution on account of the value of the silver, and also in order to enable the hypo solution to be used again. The silver can be removed from such a hypo solution by chemical means, but such methods are generally unsatisfactory. The present invention involves the continuous circulation of the hypo solution through the developing tank and through the recovery cell, in the latter of which the excess silver carried by the hypo solution is removed electrolytically.

Heretofore, cathodes of plate-form have been employed in recovery cells, but the silver depositing electrolytically on cathodes of this form can only be removed with considerable difficulty involving the scraping of the cathode plates. The efficiency of operation of such a recovery cell depends largely upon maintaining uniform conditions throughout the cell, and hence it is advantageous to maintain a uniform circulation of the liquid past the electrodes. In order to increase the efficiency of recovery cells, agitation with air bubbles has been attempted, but in practice it has been found that the bubbles tend to adhere to the cathodes, thereby preventing uniformity in action throughout the entire cell as the electric current flowing through the cell is substantially uniform, or should be uniform at all points. A non-uniform condition throughout a cell tends to cause an increased deposit of silver sulphide instead of pure silver. The deposit of silver sulphide is not desirable.

Where mechanical agitators have been used in recovery cells, there is a tendency to deposit silver sulphides beyond the ends of agitators, and hence this method of agitation is not generally satisfactory.

In the prior methods of recovering silver from hypo, the silver was allowed to accumulate in the hypo solution until it had reached a saturation of from 6 to 9 grams of silver per litre of fixing solution, and the silver was then precipitated by chemical means. In electrolytic systems the silver was allowed to accumulate in the bath until the fixing solution or hypo used in fixing motion picture films, reached a silver saturation of from 3 to 5 grams per litre in the fixing solution. Then by electrolysis the silver content was reduced to approximately one-half gram per litre. In methods previously used, it has been necessary to change the strength of current passing through the cell to correspond with the degree of concentration of the silver in the hypo.

One of the objects of my invention is to provide an apparatus and method which will enable an element such as silver, to be recovered from a bath, and to provide a construction and means for circulating the hypo through the recovery cell in such a way as to effect a substantially uniform deposit of the silver upon the different cathodes in the recovery cell. In accordance with my method, I can maintain a substantially constant silver content of about 1½ grams per litre while maintaining a substantially uniform current passing through the cell.

A further object of my invention is to provide cathodes having a form which will enable them to cooperate readily with anodes in such a way that each cathode is substantially surrounded by anodes. By having the anodes uniformly spaced and equidistant from the cathodes, the deposit on the cathode will be substantially uniform.

A further object of the invention is to provide an organization of inlet and outlet means for circulating the hypo through the recovery cell in such a way as to insure as far as possible, a substantially uniform velocity of flow of the liquid past the electrodes, and in such a way as will prevent the formation of dead spaces or pockets of poor circulation.

A further object of the invention is to provide a recovery cell having means for supporting electrodes which will give considerable flexibility in the determining of the current which passes through the cell at any particular point. In other words, to provide means whereby the current at different points in the cell may be varied if desired, to meet special conditions inherent in the particular location of the electrodes.

Further objects of the invention will appear hereinafter.

As regards the apparatus, the invention consists in the novel parts and combination of parts to be described hereinafter, all of which contribute to produce an efficient apparatus for the recovery of metal from a liquid.

As regards the method, the invention consists in those steps and combinations of steps to be described in the specification and set forth in the claims, all of which contribute to produce an efficient method for recovering a metal from a liquid.

A preferred embodiment of the invention is described in the following specification, while the broad scope of the invention is pointed out in the appended claims.

In the drawing:

Figure 1 is a diagrammatic view illustrating the essential apparatus used in a recovery system in connection with a photographic developing tank.

Fig. 2 is a diagrammatic plan of the recovery cell, and further illustrating details of the circulation system, and also the wiring system.

Fig. 3 is a diagrammatic view particularly illustrating the manner in which the silver is recovered from the rod-form cathodes.

Fig. 4 is an end elevation of the recovery tank. This view is of a diagrammatic nature, and its purpose is to disclose more fully the location of the principal inlets for the recovery cell through which inlets the hypo solution is circulated from a pump.

Referring more particularly to the parts, in applying the invention to the recovery of silver from a hypo solution used in photographic development work, I indicates a developing tank in which the plates or films to be developed are immersed. This tank I is maintained in communication with a recovery cell 2, which includes a rubber-walled container or recovery tank 3.

The recovery tank is substantially of rectangular form, and is provided with means for supporting a plurality of rod-form cathodes and a plurality of anodes, which are also preferably of rod-form. These electrodes are preferably supported on cross bars or header bars (see Fig. 1), including a plurality of anode header bars 4 and a plurality of cathode header bars 5. These bars are supported in substantially horizontal position, and parallel with each other so that they extend across above the bath 6 of liquid in a recovery tank. These electrodes should be readily removable from the supporting bars, for which purpose they are preferably formed with hooks 7 at their upper ends, which extend up from spring collars 8, which yieldingly hold the electrodes. The electrodes are all preferably spaced equidistant on the bars, and are disposed so that the anodes have a staggered relation with respect to the cathodes (see Fig. 2). By this arrangement each cathode is substantially surrounded by four anodes, said anodes being substantially equidistant from the cathode and uniformly spaced around its periphery. This arrangement is a factor which makes for uniform deposit of the silver on the cathode. The anodes 9 are, of course, hung on the anode bars, and the cathodes 10 are hung as indicated on the cathode header bars. These cathodes are simply suspended in the bath. In order to give flexibility to the circuit arrangement and to enable the electric current at different points in the recovery cell to be adapted to conditions at that point, I provide a main conductor 11 corresponding to the cathodes, and a main conductor 12 corresponding to the anodes, and these conductors are connected respectively, to their corresponding electrodes by special resistance coils 13. These coils 13 should be detachable so that the resistance can be changed as desired. This circuit, of course, connects the electrodes up in parallel with a generator 14, or other source of electromotive force, that will generate a direct current flowing from the anodes to the cathodes through the electrolyte 6. The circuit 15 through which this current flows, should include a resistance coil 16, which can be selected to give the proper general resistance in the circuit.

The fixing solution is circulated through the recovery cell by means which is adapted to give a relatively uniform flow of the solution past the electrodes. In order to accomplish this, I prefer to provide an overflow pipe connection 17 from the developing tank 1, which maintains a substantially constant level at the point 18 for the bath in the developing tank, and the liquid overflows down through this pipe connection by gravity to an inlet 19 through the wall of the recovery tank 3, and this pipe connection should include a regulating valve 20. The liquid of the recovery bath 6 is constantly withdrawn through an outlet 21, which is preferably located in the same wall as the inlet 19, but this outlet is preferably displaced in a horizontal direction from the inlet 19, and is preferably located at a slightly lower level with a baffle plate 22 extending horizontally between the inlet 19 and outlet 21. This prevents "channeling" of the liquid between this inlet and outlet, and causes the liquid to pass in the general direction indicated by the arrow at this point in Fig. 1.

The circulation through the recovery cell 2 is preferably effected through two inlets 23 and 24, the former of which is located at a relatively low level in the tank 3, and the latter of which is located at a relatively higher level; and furthermore, these inlets are displaced laterally from each other in a general horizontal direction. Each inlet is provided with a regulating valve 25, 26, connected in branch pipes 27 and 28 respectively, which connect to a main pipe 29 leading from the circulating means, such as the centrifugal pump 30 driven by a suitable motor 31. The suction side of this pump is connected by an inlet pipe 32 to the outlet 21 from the recovery cell. In order to diffuse the flow of the liquid through the inlets 23 and 24, I prefer to provide the inlet heads with curved perforated plates 33. The liquid flows through these perforations in a general radial direction, and this direction of movement as indicated by the arrows in Fig. 1, tends to prevent forming dead spaces or pockets in the vicinity of the wall 34 of the recovery tank 3, which will be located opposite to the inlet 19. The main pipe 29 is preferably provided with a lateral branch pipe 35, including a regulating valve 36, and this branch pipe connects through the bottom of the developing tank 1 near which a shut-off valve 37 is provided. The valve 36 is preferably set so that in the operation of the apparatus about 20% of the liquid coming from the pump will flow through the branch pipe 35, leaving about 80% of the liquid to flow up the pipe 29 and through the inlets 23 and 24. Furthermore, the valves 25 and 26 are preferably set so that the ratio of the quantity of liquid passing through these valves will be substantially 50:30; that is to say, for 50 gallons passing through the valve 25 there should be about 30 gallons passing through the valve 26. This gives a preponderance of liquid entering the recovery cell at a relatively low level. This gives a general upward movement of liquid in this tank. By reason of this difference in levels of the two inlets 23 and 24, and the difference in the volume of flow through these inlets a general rotary or spiral movement of the liquid is developed in the recovery tank. In other words, the liquid has a general upward movement from the inlet 23 and develops a general rotary movement at the same time.

These inlets 23 and 24 are preferably located at an opposite position from the inlet 19 and outlet 21.

The suction line 32 for the pump is preferably provided with a regulating valve 38. The general effect of the inlets 23 and 24 is to develop rotation of the liquid in an anti-clockwise direction, and this movement is assisted by the general direction of flow from the inlet 19 to the outlet 21, which is indicated by the arrow in Fig. 2.

The arrangement of piping, including the arrangement of inlets and outlets, is favorable for attaining a nice regulation of the flow through the recovery tank 3, and I regard it as advantageous to return a part of the solution from the pump 30 immediately to the developing tank 1. By this arrangement it is possible to change the proportional amounts of flow by controlling the regulating valves.

The rod-form for the cathodes is very advantageous in facilitating the removal of the silver scale that is deposited upon the cathodes. From time to time the scale can be removed, as illustrated in Fig. 3, by forcing the cathodes 10 through a die 39, which has an eye sufficiently large to pass the rod, but small enough to scrape off the silver coat or scale which can be caught in a pan 40 placed in front of the die. The pump 30 should be of a capacity to give the liquid considerable velocity of flow through the circulating system. For example, if the system has a volume of about 200 gallons, the liquid should be circulated at approximately the rate of 70 gallons per minute. This will bring about a substantially uniform deposit of silver on the electrodes. In case the deposit in any row of electrodes seems to be abnormal, this condition can be corrected by changing the resistance 13 corresponding to this location in the tank.

It is understood that the embodiment of the invention described herein is only one of the many embodiments this invention may take, and I do not wish to be limited in the practice of the invention, nor in the claims, to the particular embodiment set forth.

What I claim is:

1. In electrolytic apparatus for recovering a chemical substance from a liquid, a recovery cell having a bath of the chemical bearing liquid therein, a plurality of anodes suspended in the bath, a plurality of rod-form cathodes suspended in the bath, an inlet for the liquid at an elevated level in the bath, another inlet for the liquid at a relatively low level in the bath, one of said inlets being laterally displaced in a horizontal direction with respect to the other, means for supplying the liquid to the bath through the said inlets, and means for withdrawing liquid from the cell at a point substantially opposite to the said inlets.

2. In electrolytic apparatus for recovering a chemical substance from a liquid, a recovery cell having a bath of the chemical bearing liquid therein, a plurality of anodes suspended in the bath, a plurality of rod-form cathodes suspended in the bath, an inlet for the liquid at an elevated level in the bath, another inlet for the liquid at a relatively low level in the bath, one of said inlets being laterally displaced in a horizontal direction with respect to the other, means for supplying the liquid to the bath through the said inlets so that the quantity of liquid entering the inlet at the lower level is considerably greater than the quantity of liquid entering through the inlet at the upper level, an outlet connection located substantially opposite to the first-named inlets, and means for withdrawing liquid from the outlet connection.

3. In electrolytic apparatus for recovering a chemical substance from a liquid, a recovery cell having a bath of the chemical bearing liquid therein, a plurality of anodes suspended in the bath, a plurality of rod-form cathodes suspended in the bath, an inlet for the liquid at an elevated level in the bath, another inlet for the liquid at a relatively low level in the bath, one of said inlets being laterally displaced in a horizontal direction with respect to the other, means for supplying the liquid to the bath through the lower inlet and through the upper inlet so that a greater proportion passes in through the lower inlet than through the upper inlet, an inlet connection for admitting a quantity of the liquid to the cell located on the side opposite to the first-named inlet, an outlet connection from the cell located on the same side as the last-named inlet, and displaced laterally from the same in a substantially horizontal direction, and means for withdrawing liquid from the last-named inlet and forcing the same through the first-named inlets.

4. In electrolytic apparatus for recovering a chemical substance from a liquid, a recovery cell having a bath of the chemical bearing liquid therein, a plurality of anodes suspended in the bath, a plurality of rod-form cathodes suspended in the bath, an inlet for the liquid at an elevated level in the bath, another inlet for the liquid at a relatively low level in the bath, one of said inlets being laterally displaced in a horizontal direction with respect to the other, means for supplying the liquid to the bath through the said inlets so that the quantity of liquid entering the inlet at the lower level is considerably greater than the quantity of liquid entering through the inlet at the upper level, an outlet connection located substantially opposite to the first-named inlets, means for withdrawing liquid from the outlet connection, and deflectors over the two first-named inlets for deflecting the liquid entering through the same, laterally with respect to its direction of flow, to prevent dead pockets forming near the wall adjacent the said inlets.

5. A method of recovering a metal from a metal bearing liquid, which consists in suspending a plurality of rod-form cathodes in the bath of the liquid, withdrawing liquid from one side of the bath, and forcing the withdrawn liquid into the opposite side of the bath at one point at a lower level within the bath and at another point at a higher level within the bath, and with the points of admission of the liquid displaced laterally from each other in a horizontal direction.

6. A method of recovering a metal from a metal bearing liquid, which consists in suspending a plurality of rod-form cathodes in the bath of the liquid, withdrawing liquid from one side of the bath, and forcing the withdrawn liquid into the opposite side of the bath at one point at a lower level within the bath and at another point at a higher level within the bath, and with the points of admission of the liquid displaced laterally from each other in a horizontal direction, and regulating the admission of the liquid through the said inlets so that a relatively larger amount of the liquid is admitted to the bath at the lower level.

ALBERT B. DORAN.